UNITED STATES PATENT OFFICE.

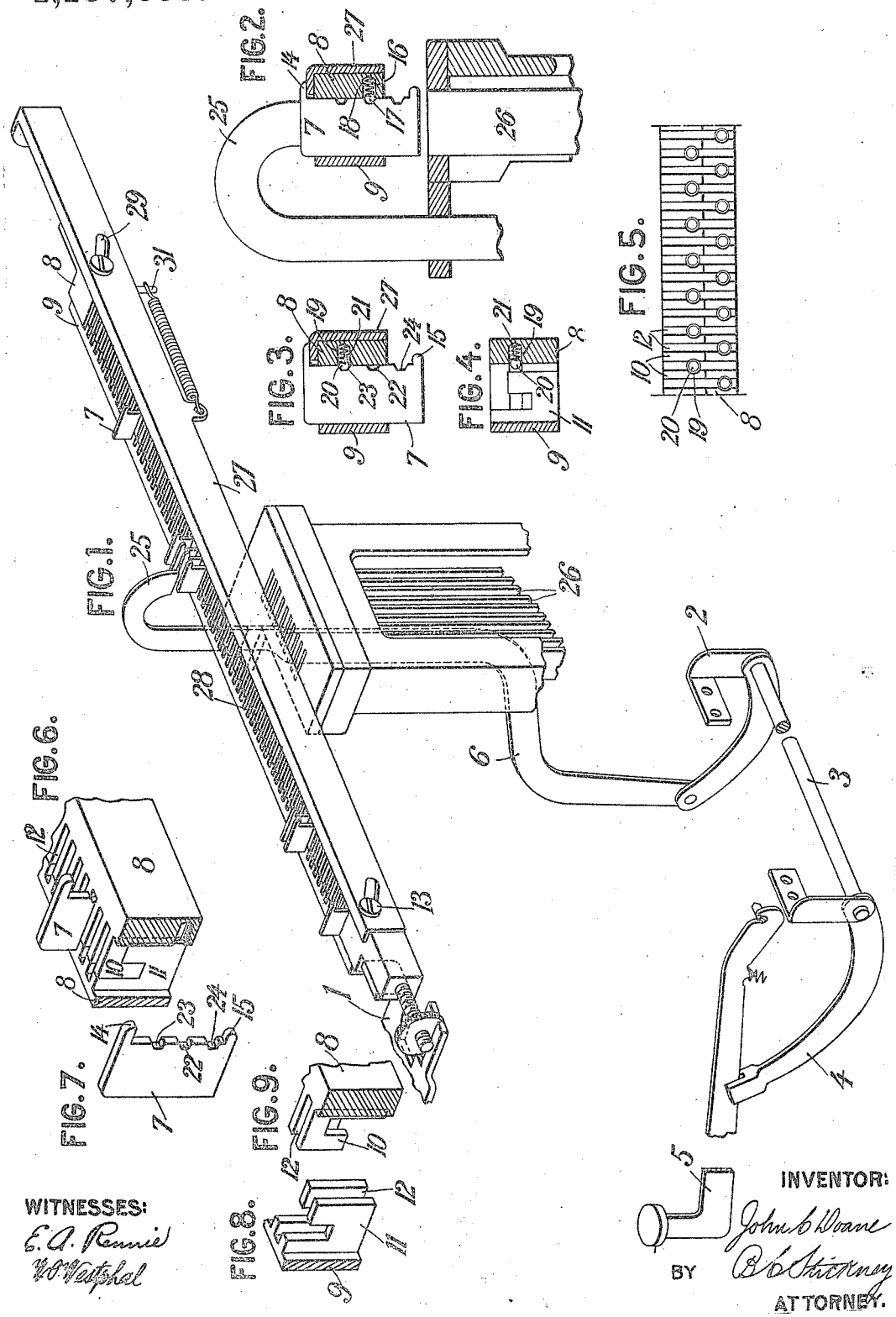

JOHN C. DOANE, OF EAST LONG MEADOW, MASSACHUSETTS, ASSIGNOR TO UNDERWOOD TYPEWRITER COMPANY, OF NEW YORK, N. Y., A CORPORATION OF DELAWARE.

TYPE-WRITING MACHINE.

1,157,683.     Specification of Letters Patent.     Patented Oct. 26, 1915.

Application filed September 17, 1914. Serial No. 862,227.

*To all whom it may concern:*

Be it known that I, JOHN C. DOANE, a citizen of the United States, residing in East Long Meadow, in the county of Hampden and State of Massachusetts, have invented certain new and useful Improvements in Type-Writing Machines, of which the following is a specification.

This invention relates to tabulators for typewriting machines, and is particularly adapted to key-set tabulators.

I produce a rack bar for the tabulator stops which is in two parts, in such manner that slideways are provided for the stops when said rack bar parts are fitted together, whereby said stops may be freely operable. I provide also improved stops for said slideways, capable of being set by a key-operated device, and improved detents for said stops. The rack bar is composed of two strips, each strip having a series of hook-like projections or tongues, which are capable of fitting together with the two parts of the rack bar engaged, thus effecting a lock joint between said two parts, with clearance spaces between adjacent tongues for the reception and operation of the stops. The rack thus has solid partitions or webs between its two parts, to establish and maintain rigidly the opposed relation of the rack parts, and to thus provide permanent slideways of a suitable character for the stops, with the length and width of those slideways or clearances accurately established and maintained. One of the rack portions is provided with a series of grooves or recesses to receive ball detents supported by springs to engage in the recesses in the stops as the latter, which consist of plates slidably engaged within the slideways aforesaid, are adjusted therein in the performance of their functions.

The stops aforesaid each have a recess to receive a detent when elevated to the inoperative position, and also a recess for engagement by the detent when moved to the operative position.

As the detents may be provided in recesses in the rack arranged in staggered relation therein to avoid weakening the rack, the stops may each have another recess in order that they may be operable with detents differently located according to the staggered arrangement.

To prevent the stops from leaving the rack bar in either direction they each have upper and lower projecting lips to overhang said rack bar, and a restoring bar, having a flange to engage under the projecting lips at one end of the stops, is arranged to be slidable at an angle, whereby lengthwise movement of said bar enables the stops to be all restored in a single operation.

Other objects and advantages will hereinafter appear.

In the accompanying drawing, Figure 1 is a perspective elevation illustrating my improved rack with stops in conjunction with the column stops used therewith, and a setting member with a key and intermediate connections operating the same. Fig. 2 is a large detail side elevation showing the rack in cross-section, a stop therein and portions of a column stop and the setting member. Fig. 3 is a detail cross-sectional view of the rack showing a stop arrested therein in operative position. Fig. 4 is a detail cross-sectional view of the rack alone. Fig. 5 is an inner surface view of one portion of the rack bar showing the recesses therein for the ball detents. Fig. 6 is a perspective elevation, in cross-section, of a portion of the rack bar showing a stop therein. Fig. 7 is a perspective detail view of a stop. Fig. 8 is a perspective detail view of a portion of one rack part. Fig. 9 is a perspective detail view of a portion of the other rack part.

The example of my invention herein contained is illustrated in the operative relation between the tabulator stops supported by the typewriter carriage, and the column stops mounted upon the frame, as of an Underwood typewriting machine.

The machine parts here shown include a supporting bracket 1, which extends from the typewriter carriage, and the bearing portions 2 carrying the rock shaft 3 which is operated by arm 4 from key lever 5 to depress the stop operating or setting member 6.

The rack to contain the vertically movable tabulator stops 7 consists of the two parts 8 and 9 respectively of the rack bar. These parts each have, extending from one surface thereof, a series of hook-shaped tongues 10 and 11 respectively, said hook-shaped tongues being adapted to fit together and interlock to form a series of spanning webs or walls between the two parts 8 and 9 of the rack bar with said parts suitably spaced apart.

In Figs. 8 and 9, respectively, will be seen the two longitudinal parts or members of the rack bar detached, but with their extending hook-like tongues 11, 10 respectively in opposed relation as for assembling, and in Fig. 6 these parts or members 9, 8 have been combined to form the rack, the hook-like tongues 10, 11 being interfitted in said Fig. 6 to form a series of spanning webs which thus serve as the lateral walls of the slideways 12 for the stops 7. It will be noted that said hook-shaped tongues, in their interlocking arrangement, are in continuous contacting relation with each other throughout the entire line of their opposing edges, and unitedly form rigid walls which secure the slideways against variation in the areas they present for the operation of the stops. The two parts or members 8, 9 of the rack bar may be united, as by screws 13 or other desirable connecting means.

The width of the clearances or slideways 12 is, of course, properly established in the production thereof, so that the stops may be free to slide within said clearances or slideways excepting as they are detained by the operative arresting means.

The stops 7 each consist of a plate of substantially rectangular form, and of dimensions in width and thickness rendering them capable of slidably fitting within the clearances or slideways 12. Said stops 7 have extending lips or flanges 14, 15 respectively at top and bottom to engage respectively with the upper and lower surfaces of one of the longitudinal portions of the rack at the opposite limits of their vertical movement, so that with the rack members and stops assembled, the stops may not inadvertently leave said rack.

One of the rack longitudinal members, as 8, is provided on its inner surface with a series of transverse horizontal cavities or recesses, one for each stop, and said stops have in opposed relation to said cavities or recesses coinciding recesses, whereby, with the aid of yieldingly presented ball detents or the like, the stops may be arrested in different positions of their vertical movement.

As the stops correspond in number with the number of letter-spaces included in a whole line of typewriting, and each stop requires detent means to arrest it in operative position, the cavities or recesses are preferably provided in the rack bar or member in staggered relation, to avoid weakening said bar by placing them in a single continuous row. Thus in the example here shown, the longitudinal rack member 8 has a lower series of cavities or recesses 16, each containing a ball detent 17 urged outwardly by a spring 18, and also has an upper series of similar cavities 19, each similarly provided with a ball detent 20 having an urging spring 21.

The stops 7, in order that they may be interchangeably employed in any of the clearance slideways 12, are provided each upon its vertical edge, which is opposed to the detent-carrying longitudinal portion of the rack, with a lower recess or notch 22 and an upper recess or notch 23 adapted respectively to aline with the recess 16 or 19, as the case may be when in the operative position. Each one of the stops 7 also has a lower notch or recess 24, which is intended to aline with a lower cavity or recess 16 when the stop is restored to its elevated or inoperative position, and obviously, if the stop be in a slideway provided with a cavity or recess 19 of the upper series, then the notch or recess 22 will aline with that cavity or recess 19 to be arrested when said stop is elevated in the inoperative position. Thus the stop provided with three notches 24, 23 and 22 is capable of employment in any one of the slideways herein, and may be arrested by a ball detent of either the upper or lower series in both the downwardly extended operative position and the upwardly extended inoperative position.

In operation, pressure upon the stop in either direction will cause the notch engagement of the stop with the ball detent to press said ball within its cavity against the tension of its spring, allowing said stop to freely slide through the rack until it reaches its adjusted position at which again arrested by its next succeeding notch engaging the same ball detent.

The means whereby the stops 7 are moved to their operative positions comprise the operating member 6, which has a return hook-portion 25 arranged centrally of the machine, and adapted when depressed to meet the particular stop 7 that has been alined thereunder through movement of the carriage. The stops 7 are all normally elevated to be inoperative, and when adjusted in operative position, are arranged to coöperate with the usual counter stops, as 26.

When it is desired to restore the stops 7 to their normal inoperative position, a longitudinal slide bar 27, having a flange 28, which lies beneath the upper lips or flanges 14 of the stops 7, is shifted longitudinally, in which action said slide 27, having inclined slots 29 engaged by the screws 13 or other fixed guides, rises diagonally and thereby lifts said stops 7 to thus restore them.

The slide 27 has a spring 30 engaged at one end therewith, the other end of said spring having a fixed connection, as at 31, whereby said slide is automatically returned to its normal position after having restored the stops to their normal position.

Variations may be resorted to within the scope of the invention, and portions of the improvements may be used without others.

Having thus described my invention, I claim:

1. In a tabulating device, a rack bar composed of two longitudinal members with spaced engaging projections forming slideways for internal stops.

2. In a tabulating device, a rack bar composed of two longitudinal members with spaced interfitting projections forming slideways for internal stops.

3. In a tabulating device, the combination of a rack bar composed of two longitudinal members with spaced interengaging projections forming slideways, and stops operable in said slideways.

4. A rack bar for tabulators composed of two longitudinal members having opposed hook-like projections arranged to interlock and form continuous webs, the spaces between adjacent webs serving to contain movable stops.

5. In a tabulating device, the combination of a rack bar composed of two longitudinal members having opposed hook-like projections arranged to interlock and form continuous webs, said webs being spaced equi-distantly to form a row of guideways, and a series of stops slidably contained in said guideways.

6. In a tabulating device, the combination of a rack bar having a series of guideways and a series of stops slidable therein, said rack bar having, at one side, a series of detents arranged in parallel rows in staggered relation, and a series of stops slidable in said guideways, said stops being provided with flanges for retaining them in said guideways, said stops having notches arranged to coöperate with detents in each row in projected and returned positions, whereby succeeding stops are detained alternately by a detent in each of said rows of detents.

7. In a tabulating device, a two-part rack bar separable lengthwise, spaced projections on each of said parts engaging projections on the other of said parts, the spaces between the projections forming guideways, and means for holding said parts together.

8. In a tabulating device, the combination with a rack bar formed in two parts, said parts when united forming a series of internal guideways, stops slidable in said guideways, flanges at the extremities of said stops preventing removal of said stops from the guideways, and a slide bar adapted to engage one set of said flanges on all the stops, whereby all of said stops may be removed to normal or ineffective position.

9. In a tabulating device, the combination with a rack bar formed in two parts, the two parts inclosing a series of internal guideways, stops slidable in said guideways, said stops having flanges at their upper and lower edges, and a longitudinally and upwardly movable slide bar provided with a part adapted to engage the upper of said flanges, whereby said stops may be all moved to normal or ineffective position.

10. In a tabulating device, the combination with a rack bar having a series of internal guideways, of recesses arranged in staggered relation in rows along one side of said rack bar, detents in said recesses, and a series of stops, each of said stops being provided in one face with a series of means greater in number than the rows of recesses for engaging one of said detents.

11. In a tabulating device, the combination with a rack bar having a series of internal guideways, of recesses arranged in one side of said rack bar, one recess in each guideway, the recesses being arranged in staggered relation in two rows along the rack bar, detents in each of said recesses, and a series of stops slidable one in each guideway, the face of each stop next to said recess in the rack bar being provided with three recesses, the detents between any two of which are equal to the distance between the rows of recesses in the rack bar, whereby any stop may be arrested by engagement with one of said recesses with the detent in said rack bar to hold it in operative or inoperative position.

JOHN C. DOANE.

Witnesses:
FRANK A. COOK,
ABRAHAM E. SNOW.